March 4, 1947.　　　F. A. REECE　　　2,416,772
PILOTAGE ROTAMETER
Filed May 17, 1943　　　7 Sheets-Sheet 1

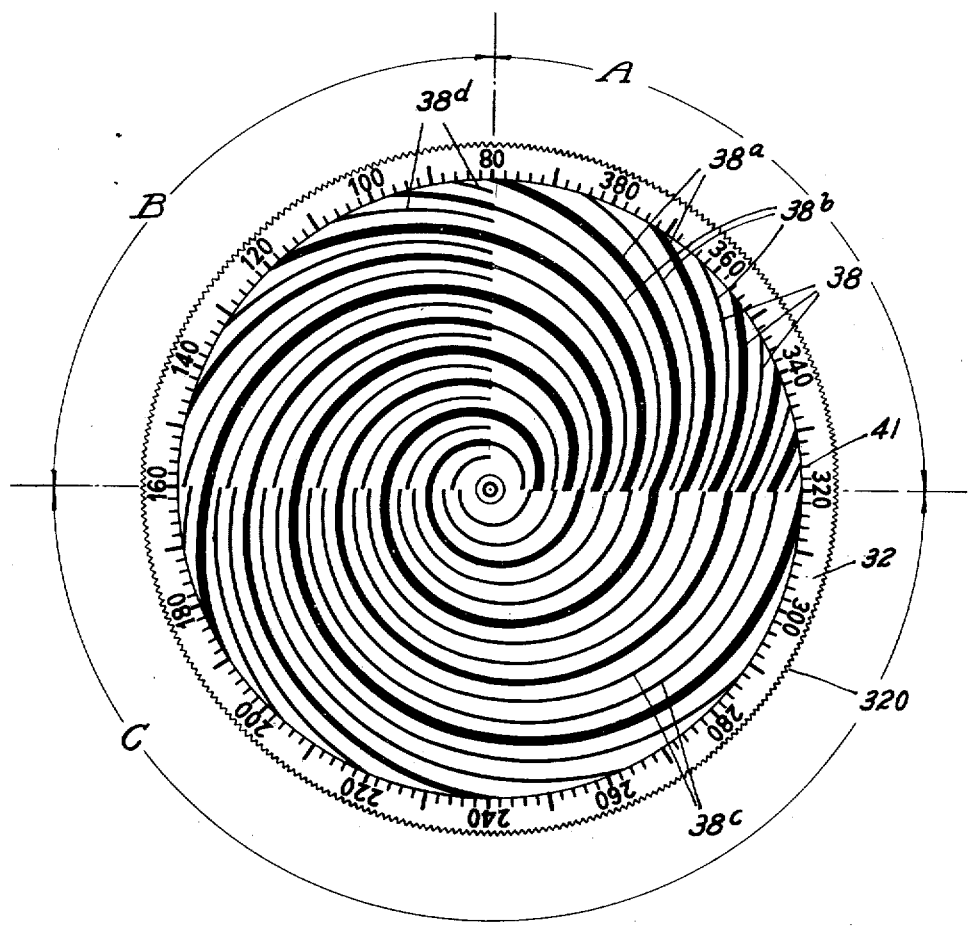
Fig_6

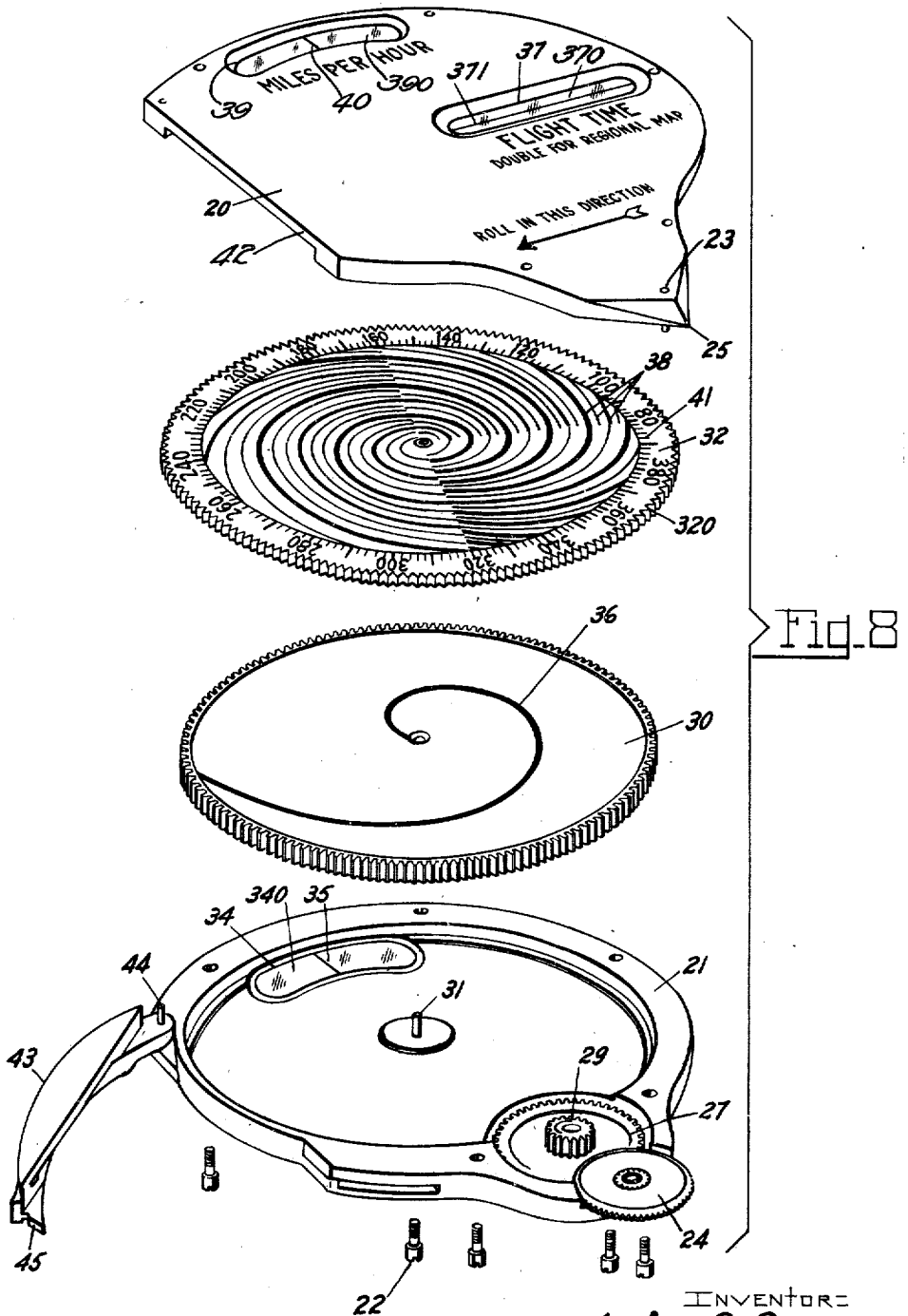

March 4, 1947.  F. A. REECE  2,416,772
PILOTAGE ROTAMETER
Filed May 17, 1943  7 Sheets-Sheet 7

INVENTOR:
Franklin A. Reece,
by Pike, Colvin & Porter,
Attys.

Patented Mar. 4, 1947

2,416,772

UNITED STATES PATENT OFFICE 2,416,772

PILOTAGE ROTAMETER

Franklin A. Reece, Brookline, Mass.

Application May 17, 1943, Serial No. 487,377

11 Claims. (Cl. 33—142)

This invention relates to a combined computing and map measuring instrument adapted especially, although not exclusively, to aerial navigation, and capable, in conjunction with a suitable map, of indicating directly the time required to cover given distances, or, conversely, the distance covered in given times, at a given ground speed, as well as affording convenient means for directly determining actual ground speed. By setting the instrument for the estimated or assumed ground speed, and moving the same over a given course on a map, an indicator, movable over a time scale, is caused to indicate on said scale the time required (at that ground speed) to cover any distance traversed by the instrument on the map. Consequently, by moving the instrument over the map between a point of departure and a given objective, the prospective time of arrival at such objective will be directly given by the position of the indicator on the scale. Also, by moving the instrument over the course on the map until the indicator registers on the scale the actual time (as shown by a suitable timepiece) which has elapsed since departure, the pilot's position at that time is determined by the position of the instrument on the map whether the ground is visible or not. The correctness of the original assumption as to ground speed (and the consequent initial setting of the instrument for this factor) can be checked, and verified or corrected, at an early period in the flight (and from time to time thereafter) by observing the time of arrival over a recognizable landmark appearing on the map, traversing the instrument over the map from the starting point to the landmark, comparing the observed time (i. e. the time actually consumed in flying from the starting point to the landmark), with the time registered by the indicator on the time scale, and the ground speed setting changed, if necessary, to make the indicator register the actual observed time, whereupon the ground speed will be directly shown by such setting.

The ability to determine actual ground speed quickly and accurately is itself a great advantage, and so is the ability to make frequently repeated checks without using a great deal of the navigator's time for computations. There is also the further advantage that the instrument aids the navigator in "dead reckoning" (in which a course is estimated from the air speed and the direction and velocity of the wind) by supplying a check on the speed along the course followed.

The instrument can be made very small and compact, is easy to operate, and by a simple manipulation, gives the desired information directly without resort to the troublesome and time-consuming velocity-distance-time calculations heretofore required for this purpose.

The invention will be best understood from the following description of a preferred embodiment thereof shown in the accompanying drawings, this, however, having been chosen for purposes of exemplification merely, as it is contemplated that said invention, as defined by the claims hereunto appended, may be otherwise embodied without departure from the spirit and scope thereof.

In said drawings:

Fig. 6 is a front elevation of the transparent speed and time scale disk.

Fig. 7 is a view similar to Fig. 1 partly broken away to show the locking relationship between the casing cover and the edge of the speed and time scale disk.

Fig. 8 is a perspective view showing the parts partly disassembled and separated.

Figure 1:
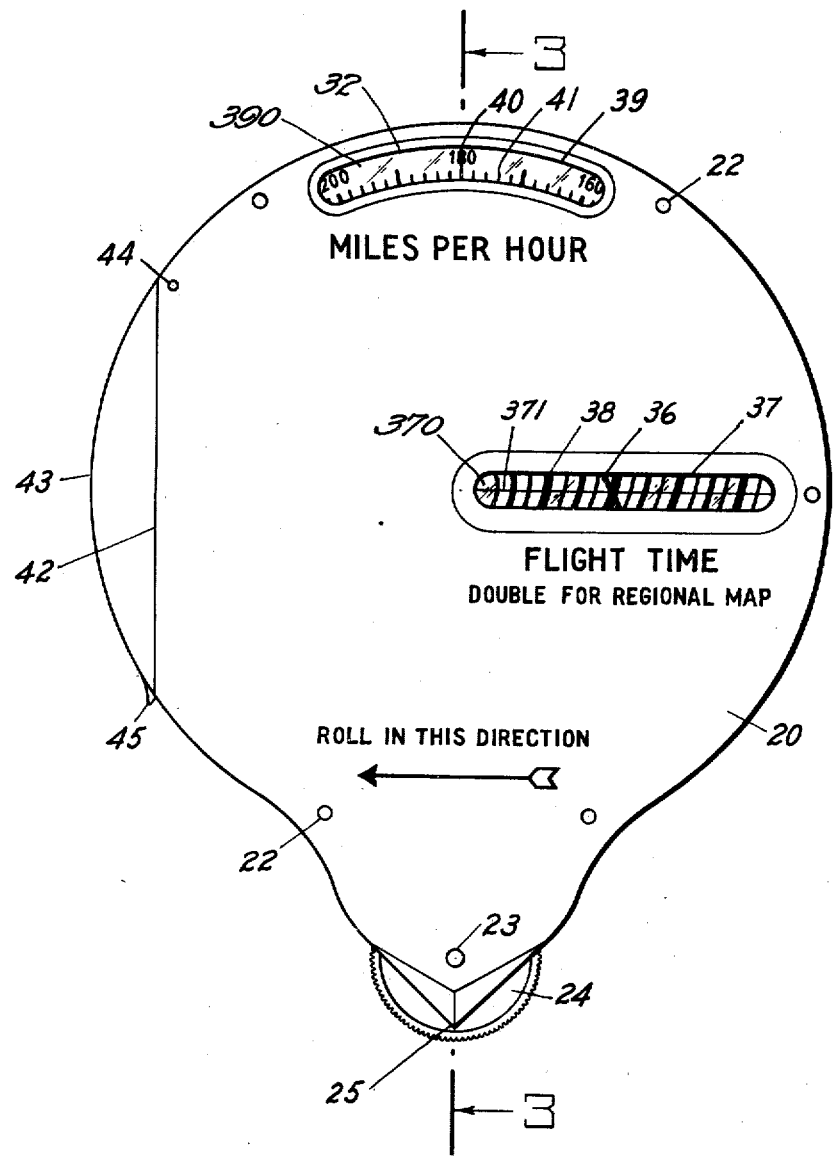
Fig. 1 is a front elevation and Fig. 2 a rear elevation, both considerably enlarged, of an instrument embodying the invention.

As shown, the casing of the instrument comprises front and rear face plates 20 and 21 secured together by screws 22, said plates being suitably interiorly recessed to receive certain gears and disks hereinafter referred to. At the bottom of the casing, rotatably mounted on a jewel pin 23, is a traction wheel 24 which projects through a slot in the plate 21 and is formed with a knurled or serrated edge. The lower ends of both plates are formed with extended index points 25 located adjacent the periphery of the wheel 24 at the point where the latter engages the surface of the map, when the instrument is held upright, to assist in accurately determining the position of the instrument with respect to the map at any time. Secured to or formed integral with the traction wheel 24 is a coaxial pinion 26 which meshes with an intermediate gear 27 rotatably mounted on a jewel pin 28. Secured to or formed integral with the gear 27 is a coaxial pinion 29 which meshes with teeth formed on the periphery of relatively large gear or disk 30 rotatably mounted on a jewel pin 31. Interposed between the front plate 20 and disk 30, and rotatable coaxially with but independently of the latter, is a thin, transparent disk 32 having a knurled or serrated edge 320.

Figure 2:
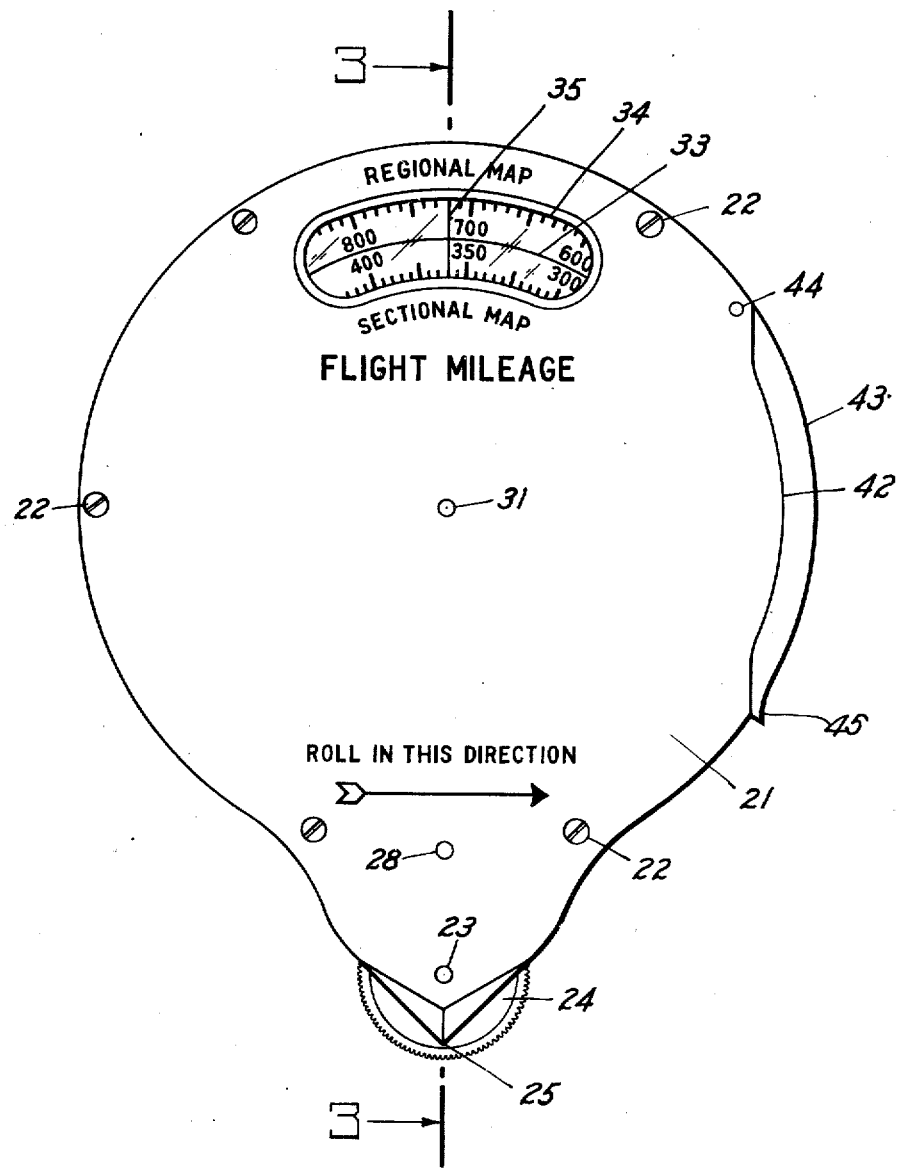
Figure 3:
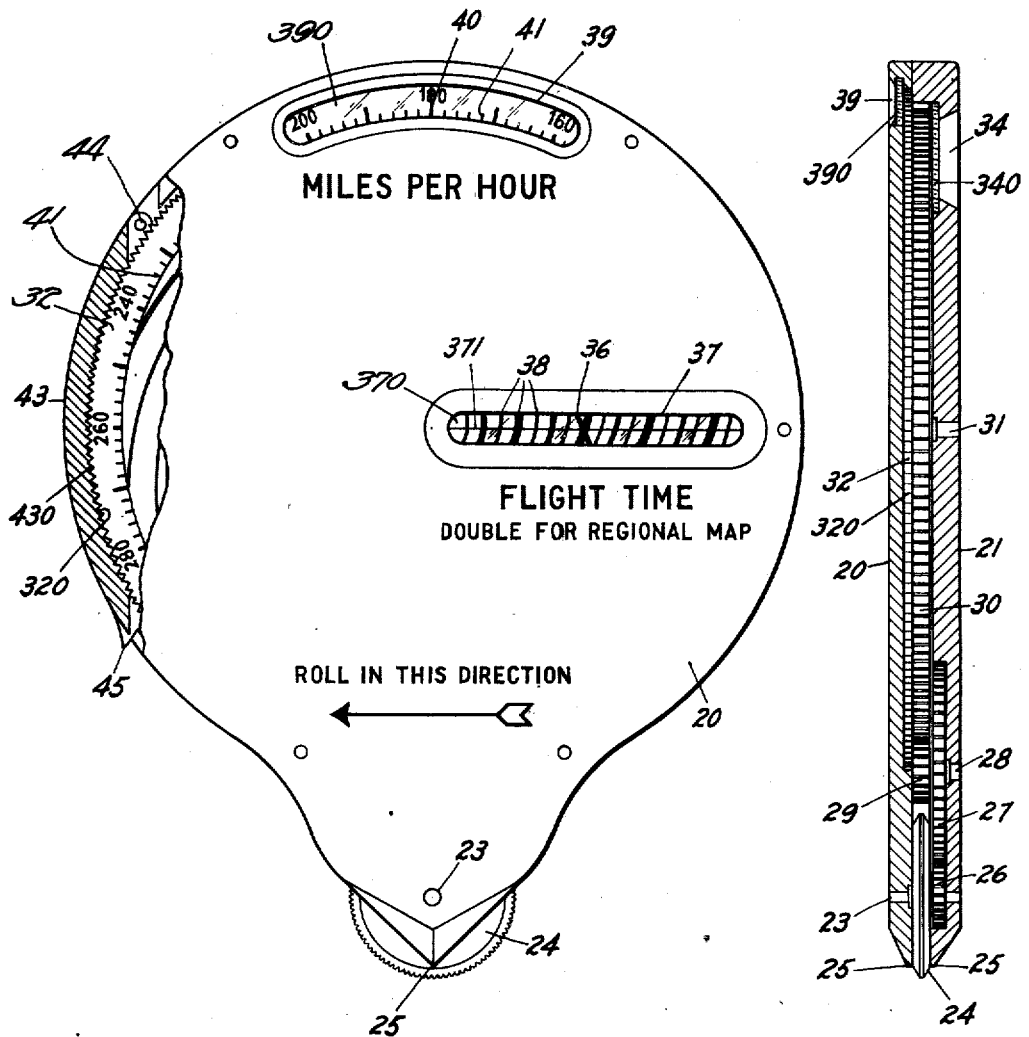
Fig. 3 is a section taken substantially on the line 3—3, Figs. 1 and 2.
Figure 5:
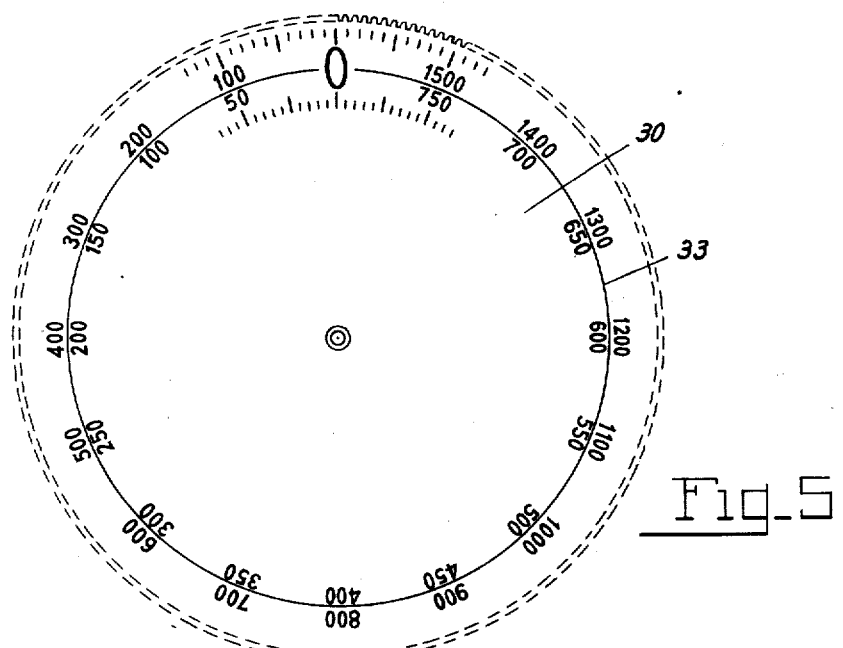

On its rear face (see Fig. 5) the disk 30 has inscribed about its margin a circumferential scale 33 graduated in miles and a portion of which is visible through an arcuate sight opening 34 (Figs. 2, 3 and 8) in the rear plate 21, which opening is provided with a transparent cover 340 having thereon an index mark 35 cooperating with the scale 33. The basis of graduation of the scale 33, in connection with the ratio of the gearing connecting the traction wheel 24 and disk 30, is so coordinated with the scale of the map with which the instrument is used that, when the traction wheel is caused to traverse a given distance on the map, the corresponding distance in miles will be indicated on the scale 33 by the index mark 35, the instrument in this respect constituting a rotameter map measurer of well known type. The scale 33 preferably includes two sets of graduations spaced, respectively, in accordance with the two standard scales to which aviation maps are customarily plotted.

Figure 4:
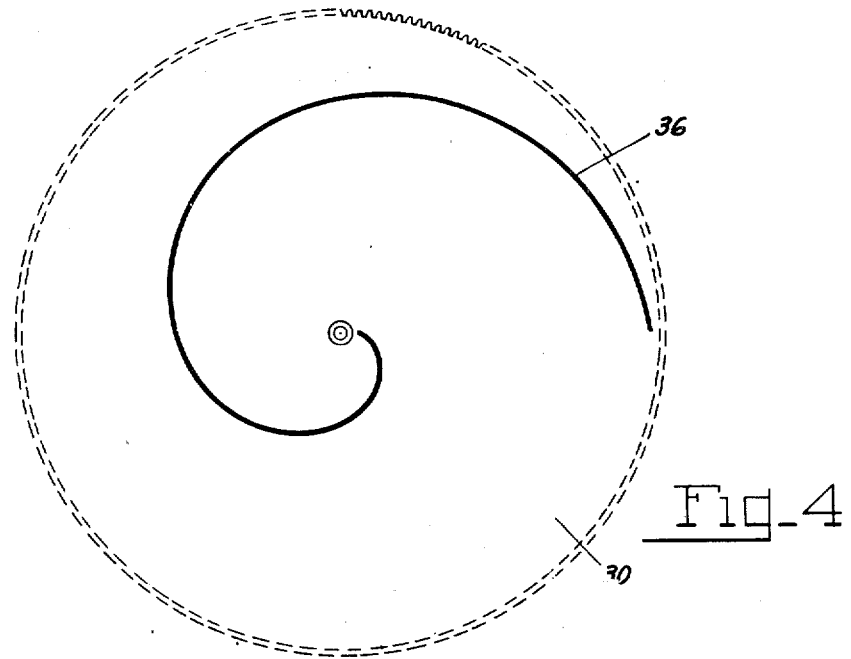
Fig. 4 is a front elevation and Fig. 5 is a rear elevation of the main gear or combined distance and time indicator disk.

On its front face (see Fig. 4) the disk 30 is inscribed with a spiral line 36 which intersects a straight radial slot 37 (Figs. 1, 7, 8 and 9) in the front plate 20. The spiral 36, as shown, has its inner and outer ends substantially radially opposite one another, so that, during one complete rotation of the disk 30, the point of intersection of the line 36 with the slot 37, i. e., the portion of said line intercepted by said slot, will traverse said slot from end to end.

The transparent disk 32 (through which the portion of the line 36 intercepted by the slot 37 is clearly visible) is inscribed with a series of spiral lines 38 (Figs. 6 and 8) which likewise intersect the slot 37, and which, in their relation to said slot, diverge outwardly radially of the disk. The slot 37 is provided with a transparent cover 370 (Fig. 8). The portions of the lines 38 intercepted by the slot 37, or, more accurately, the points of intersection of said lines with a reference line 371 on the cover 370, constitute the graduations of a time scale, and the spacing of said graduations can be varied, uniformly and infinitely within the limits of the particular instrument, by turning the disk 32. In other words, by adjustment of the disk, the spacing of the graduations may be varied through infinitesimal increments to produce any desired variation of said spacing. Certain of the lines 38, e. g., those designated 38a (Fig. 6), are relatively heavy, or are distinctively colored, and designate hour intervals. Between the lines 38a, other lines may be provided to indicate intervals of fractions of an hour; for example, in the region indicated at A in Fig. 6, where the spirals are relatively closely spaced, lines 38b, located between the lines 38a, may indicate half hour intervals; in the region indicated at B, where the spirals are more widely spaced, lines 38d located between the lines 38a and 38b both of which are continued from the region A, may indicate quarter hour intervals; and in the region indicated at C where the spirals are still more widely spaced, lines 38c, also located between the continued lines 38a and 38b, may indicate ten minute intervals. The portion of the spiral line 36 intercepted by the slot 37 (and intersecting the reference line 371) constitutes an indicator which, as the disk 30 is rotated, moves over the time scale 371, 38. Since the adjustability of the spacing of the graduations of the time scale is infinite, or through infinitesimal increments, the amounts indicated by said indicator on said scale can be made to bear any desired ratio to the movement of said indicator.

The disk 32 (Fig. 6) also has inscribed about its margin a circumferential speed (miles per hour) scale 41 a portion of which is visible through an arcuate sight opening 39 (Figs. 1, 3, 7, 8 and 9) in the front plate 20, which opening is provided with a transparent cover 390 having thereon an index mark 40 cooperating with the scale 41. At one side, the casing of the instrument is cut away, as indicated at 42, to provide an opening through which a portion of the serrated edge of the disk 32 is accessible (see Fig. 9) in order to permit the disk to be turned and cause different speeds to be indicated on the scale 41 by the index mark 40. The opening is normally closed by a cover 43 hinged to the casing at 44 and secured in closed position by a suitable latch 45, the inner arcuate surface of the cover 43 being serrated complementarily to the serrated edge 320 of the disk 32, as shown at 430 in Fig. 7, so that when the cover is closed said disk will be locked in its angularly adjusted position.

The relationship of the graduations of the scale 41 to the spiral lines 38, and to the distance scale 33 and indicator spiral line 36, is such that, when the disk 32 is angularly adjusted to cause a given number of miles per hour to be indicated on the speed scale 41 at the index mark 40, the points of intersection of the lines 38 with the line 371 will be so spaced that, when the disk 30 has been turned sufficiently to cause that number of miles to be indicated on the distance scale 33 by the index mark 35, the point of intersection of the line 36 with the line 371 will be at the one hour graduation of the scale 371, 38.

In use, in order to determine the prospective time of arrival at a given objective, i. e. the time which will elapse between departure and arrival, the disk 32 is turned until the estimated ground speed on the scale 41 is at the index mark 40, the traction wheel 24 is turned to bring the zero point on the scale 33 to the index mark 35 and the instrument is moved over the map (with the traction wheel 24 in engagement with the map surface) between the point of departure and said objective, whereupon the time in question will be immediately and directly shown by the position of the indicator 36 on the time scale 371, 38. To determine the pilot's position on a given course at any time, the zero point on the scale 33 is again set at the index mark 35 and the instrument moved over the course on the map from the point of departure until the time shown on the scale 371, 38 by the indicator 36 corresponds with the actual elapsed flight time (as shown by the pilot's watch), whereupon the pilot's position will be indicated on the map by the point 25. The foregoing depend upon the correctness of the initial estimate of (and setting for) ground speed. However, upon arrival over a recognizable landmark shown on the map, the instrument (with the scale 33 initially set at zero) is moved over the map from the point of departure to the landmark and the time as shown by the indicator 36 on the scale 371, 38 compared with the actual flight time as shown by the pilot's watch. If these agree, the initial estimate and setting were correct. If not, the disk 32 is turned to vary the spacing of the graduations of the scale 371, 38 until the actual time is shown on said scale by the indicator 36, whereupon the true ground speed will be directly indicated on the scale 41 by the index mark 40.

Similar checks, corrections, and determinations can thereafter be made from time to time as other landmarks are reached.

Figure 9:
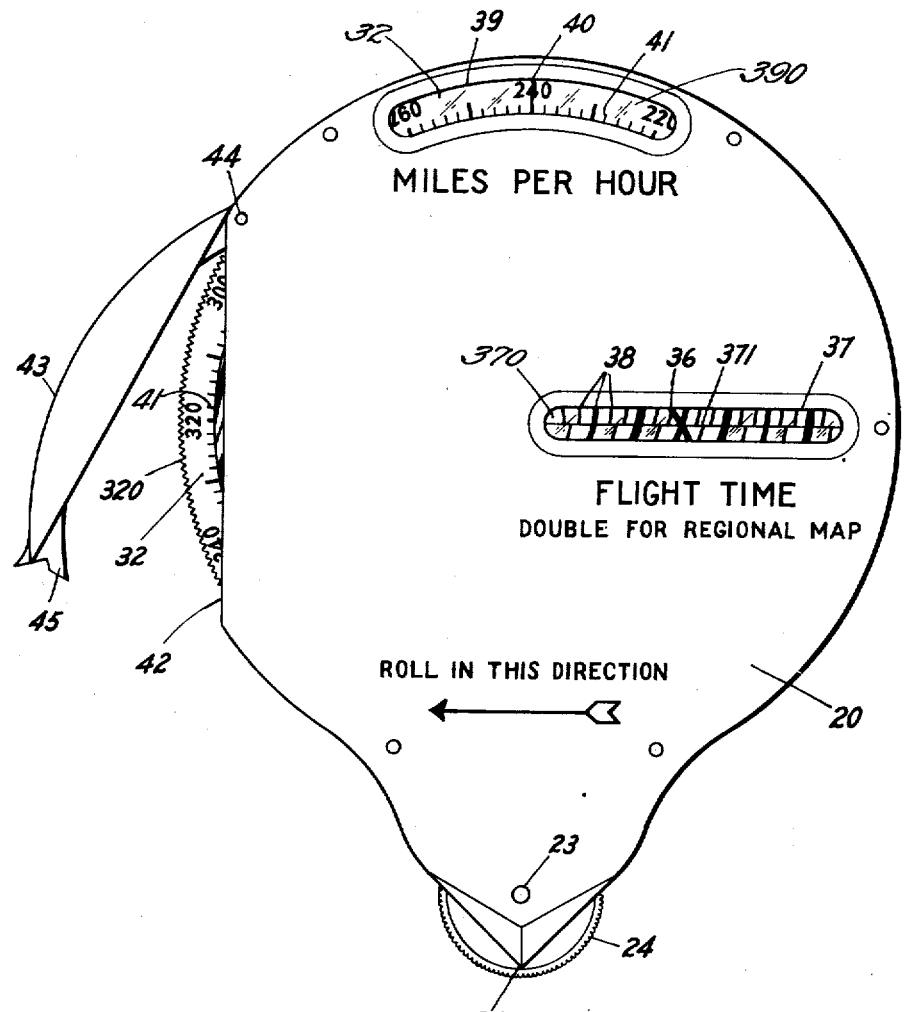
Fig. 9 is a view similar to Fig. 1 but showing the cover open and the parts differently adjusted.

For example (assuming a simple but somewhat extreme case), in Fig. 1, the instrument is shown as having been set for an assumed ground speed of 180 miles per hour, and, the instrument having been moved over the map from the point of departure to a given landmark, the indicator 36 is at the 2 hour point on the scale 371, 38. Upon arrival over the landmark, the pilot finds, by consulting his watch, that the actual time which has elapsed since leaving the point of departure has been only 1½ hours. The disk 32 is then turned to bring the line 38 representing 1½ hours opposite the (then) position of the indicator line 36 (i. e. the points of intersection of said lines with the reference line 371), as shown in Fig. 9, whereupon the true ground speed for the course, namely, 240 miles per hour, will be indicated on the scale 41 by the index mark 40, as also shown in Fig. 9.

While certain specific uses of the instrument have been above described, it will be observed that the invention, considered in its more general aspect, provides an instrument whereby problems involving the time-distance-velocity (speed) relationship can be quickly and readily solved, without collateral calculations, and the result immediately and directly indicated, by a simple setting of the instrument. In other words, if any two of the above three factors are known, and the instrument set in accordance therewith, the third factor will be automatically and directly registered. For example, if the speed and time are known, the disk 32 set to indicate the speed on the scale 41 at the index mark 40 (thereby adjusting the scale 37—38), and the disk 30 turned (as by traversing the traction wheel 24 over a map or otherwise) until the line 36 intersects scale 37—38 at a point corresponding to the time, the distance will be directly indicated on the scale 33 by the index mark 35. If the distance and time are known, the disk 30 set to indicate the distance on the scale 33, and the disk 32 turned to cause the graduation 38 corresponding to the time to intersect the line 36, the speed will be directly indicated on the scale 41. If the distance and speed are known, the disk 30 set to indicate the distance on the scale 33, and the disk 32 set to indicate the speed on the scale 41, the time will be directly indicated by the line 36 on the scale 37—38.

I claim:

1. A computing map measuring instrument comprising a traction element movable over a map surface in engagement therewith, a scale graduated in units of time, a movable indicator, means connecting said traction element and indicator to cause said indicator to move over said scale distances proportional to the distances traversed by said element, said scale being adjustable to cause said indicator to indicate on said scale variable times with respect to the distances traversed by said element, and a speed scale for indicating the adjustment of said time scale.

2. A computing map measuring instrument comprising a traction element movable over a map surface in engagement therewith, a face plate having a slot therein, an indicator movable lengthwise of said slot, means connecting said traction element and indicator to cause said indicator to move distances proportional to the distances traversed by said element, and a member disposed beneath said face plate and having thereon diverging lines portions of which are intercepted by said slot, the portions of said lines intercepted at said slot constituting the graduations of a scale, and said member being adjustable relative to said face plate to vary the spacing of said graduations.

3. A computing map measuring instrument comprising a traction element movable over a map surface in engagement therewith, a face plate, an angularly adjustable disk disposed beneath said face plate and having thereon outwardly diverging spiral lines, said plate having a slot therein disposed radially of said disk and intercepting portions of said lines, an indicator movable lengthwise of said slot, and means connecting said traction element and indicator to cause said indicator to move distances proportional to the distances traversed by said element, the portions of said lines intercepted at said slot constituting the graduations of a scale, and the spacing of said graduations being variable by angular adjustment of said disk.

4. A computing map measuring instrument comprising a traction element movable over a map surface in engagement therewith, a face plate, an angularly adjustable disk disposed beneath said face plate, said disk having about its margin a circumferential scale graduated to represent speed and also having, within said scale, a series of outwardly diverging spiral lines, said face plate having a sight opening through which said speed scale is readable and also having a slot disposed radially of said disk and intercepting portions of said lines, an indicator movable lengthwise of said slot, and means connecting said traction element and indicator to cause said indicator to move distances proportional to the distances traversed by said element, the portions of said lines intercepted at said slot constituting the graduations of a scale, and the spacing of said graduations being variable by angular adjustment of said disk, which adjustment is indicated by the portion of said speed scale appearing at said sight opening.

5. A computing map measuring instrument comprising a traction element movable over a map surface in engagement therewith, a rotary disk havig a spiral line thereon, means connecting said traction element and disk for rotating said disk as said element is moved over said surface, a face plate overlying said disk, a graduated scale defined by a slot in said face plate disposed radially of said disk, the portion of said spiral line intercepted by said slot constituting an indicator which, as said disk is rotated, moves lengthwise of said slot, and the spacing of the graduations of said scale being adjustable to cause said indicator to indicate on said scale variable amounts with respect to the distances traversed by said element.

6. A computing map measuring instrument comprising a traction element movable over a map surface in engagement therewith, front and rear face plates, a rotary disk disposed between said plates, said disk having about the margin of its rear face a circumferential scale graduated in distances and also having on its front face a spiral line, said rear face plate having a sight opening through which said distance scale is readable, means connecting said traction element and disk for rotating said disk as said element is moved over said surface, a graduated time scale defined by a slot in said front face plate disposed radially of said disk, the portion of said spiral line intercepted by said slot constituting an indicator which, as said disk is rotated, moves lengthwise of said slot, the spacing of the graduations of said time scale being adjustable to cause said indicator to indicate on said scale variable times with respect to the distances traversed by said traction element, and means for indicating the adjustment of said time scale in terms of speed.

7. A computing map measuring instrument comprising a traction element movable over a map surface in engagement therewith, a face plate, superposed coaxial indicator and scale disks disposed beneath said face plate, the overlying one of said disks being transparent to render visible the underlying disk, said scale disk being angularly adjustable and having thereon outwardly diverging spiral lines, and said indicator disk having a spiral line thereon, and means connecting said traction element with said indicator disk for rotating the latter as said element is moved over said surface, said face plate having a slot therein disposed radially of said disks and intercepting portions of the spiral lines on said disks, the portions of the lines on said scale disk intercepted at said slot constituting the graduations of a scale, the spacing of said graduations being variable by angular adjustment of said scale disk, and the intercepted portion of the line on said indicator disk constituting an indicator which, as said indicator disk is rotated, moves lengthwise of said slot.

8. A computing map measuring instrument comprising spaced front and rear face plates, a traction wheel journalled between said plates and projecting beyond the same, said wheel being adapted to be moved over a map surface and rotated by engagement therewith, coaxial scale and indicator disks between said plates, said scale disk being disposed between the indicator disk and front face plate and being transparent, said scale disk being angularly adjustable and having thereon diverging spiral lines, and said indicator disk having a spiral line on its front face, and gearing connecting said traction wheel with said indicator disk for rotating the latter as the former is rotated, said front face plate having a slot therein disposed radially of said disks and intercepting portions of the lines thereon, the portions of the lines on said scale disk intercepted at said slot constituting the graduations of a time scale, the spacing of said graduations being variable by angular adjustment of said scale disk, and the intercepted portion of the line on said indicator disk constituting an indicator which, as said indicator disk is rotated, moves lengthwise of said slot.

9. A computing map measuring instrument comprising spaced front and rear face plates, a traction wheel journalled between said plates and projecting beyond the same, said wheel being adapted to be moved over a map surface and rotated by engagement therewith, coaxial scale and indicator disks between said plates, said scale disk being disposed between the indicator disk and front face plate and being transparent, said scale disk being angularly adjustable and having about its margin a circumferential scale graduated to represent speed and also having, within said scale, a series of diverging spiral lines, and said indicator disk having about the margin of its rear face a circumferential scale graduated in distances and also having a spiral line on its front face, said rear face plate having a sight opening through which said distance scale is readable, and gearing connecting said traction wheel with said indicator disk for rotating the latter as the former is rotated, said front face plate having a sight opening through which the speed scale on said scale disk is readable and also having a slot therein disposed radially of said disks and intercepting portions of the lines thereon, the portions of the lines on said scale disk intercepted at said slot constituting the graduations of a time scale, the spacing of said graduations being variable by angular adjustment of said scale disk, which adjustment is registered by the portion of said speed scale appearing at the sight opening in the front face plate, and the intercepted portion of the line on said indicator disk constituting an indicator which, as said indicator disk is rotated, moves lengthwise of said slot.

10. A time-distance-velocity computing instrument comprising, in combination, a traction wheel movable over a map in contact therewith, a pair of members one of which has diverging lines thereon, and the other of which provides a line intercepting the diverging lines on the other member, one of said pair of members being adjustable to a fixed position, connections with said traction wheel whereby movement of the wheel over the map moves one of said pair of members relatively to the other, a scale indicating the extent of movement of the non-adjustable member of said pair, and a scale indicating the position of adjustment of the adjustable member.

11. A time-distance-velocity computing instrument comprising, in combination, a traction wheel movable over a map in contact therewith, a pair of members one of which has diverging lines thereon and the other of which provides a line intercepting the diverging lines on the other member, one of said members being adjustable to a fixed position, connections with said traction wheel whereby movement of the wheel moves one of said members relatively to the other, a scale calibrated in distances and indicating the extent of movement of the non-adjustable member and consequently the distance of the map traversed by the traction member, and a scale calibrated in units of velocity and indicating the position of adjustment of the adjustable member.

FRANKLIN A. REECE.

REFERENCES CITED

The following references are of record in the file of this patent:

UNITED STATES PATENTS

| Number | Name | Date |
| --- | --- | --- |
| 919,016 | Irino | Apr. 20, 1909 |
| 1,718,052 | Lineaweaver | June 18, 1929 |
| 1,942,130 | Woodcock | Jan. 2, 1934 |
| 2,012,023 | Richardson | Aug. 20, 1935 |
| 845,463 | Hinks | Feb. 26, 1907 |
| 1,404,450 | Lofland | Jan. 24, 1922 |
| 2,334,287 | Reece | Nov. 26, 1943 |

FOREIGN PATENTS

| Number | Country | Date |
| --- | --- | --- |
| 436,546 | French | Jan. 25, 1912 |
| 507,697 | German | Sept. 25, 1930 |